J. F. SULLIVAN.
VEHICLE SIGNAL.
APPLICATION FILED JUNE 3, 1914.
1,169,885.
Patented Feb. 1, 1916.
2 SHEETS—SHEET 1.
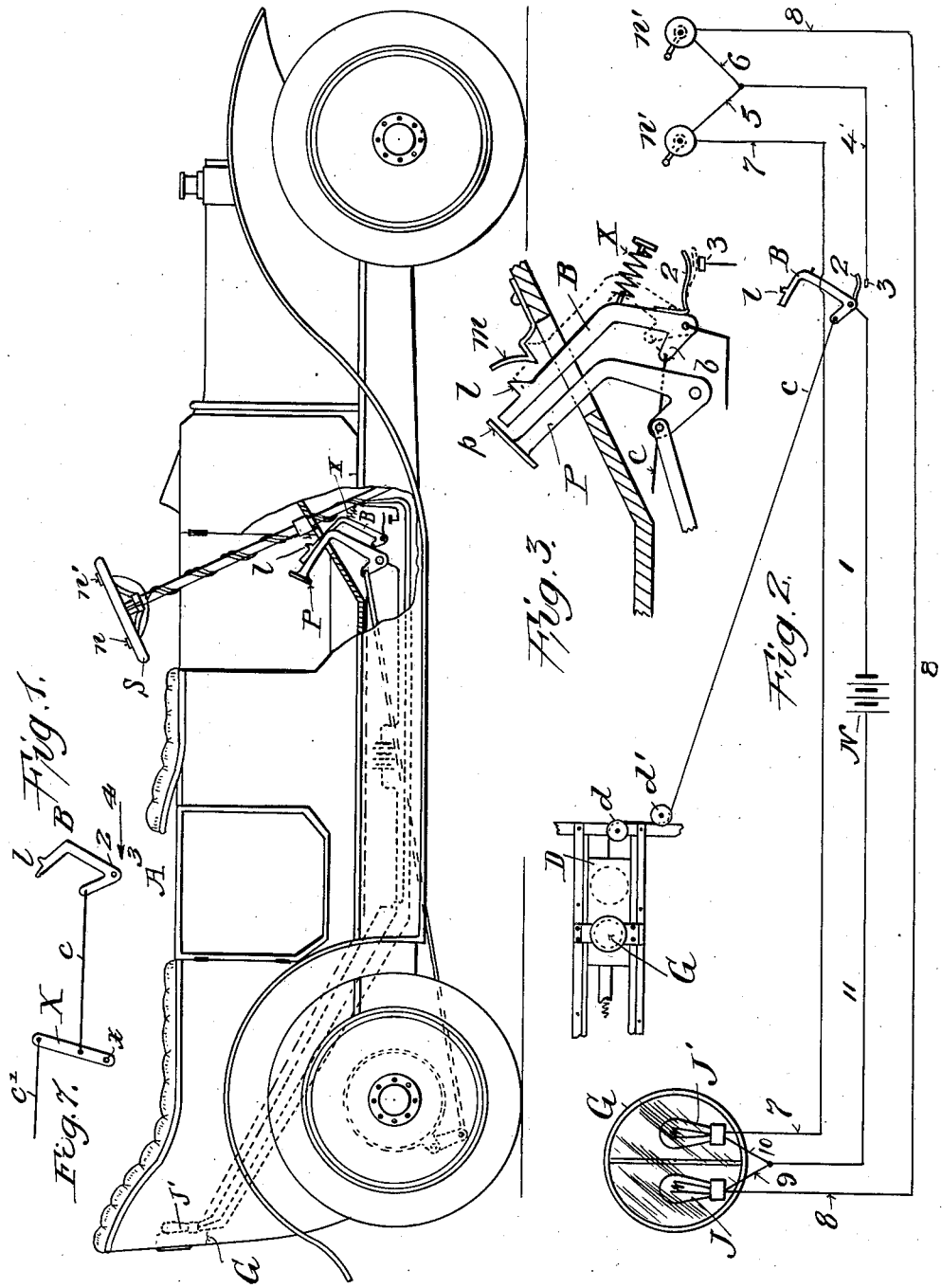
Witnesses:
Inventor
John F. Sullivan
By his Attorney
D. Walter Brown

J. F. SULLIVAN.
VEHICLE SIGNAL.
APPLICATION FILED JUNE 3, 1914.

1,169,885.

Patented Feb. 1, 1916.
2 SHEETS—SHEET 2.

Witnesses:
Inventor
John F. Sullivan
By his Attorney
D Walter Brown

UNITED STATES PATENT OFFICE.

JOHN F. SULLIVAN, OF NEW YORK, N. Y.

VEHICLE-SIGNAL.

1,169,885.  Specification of Letters Patent.  Patented Feb. 1, 1916.

Application filed June 3, 1914. Serial No. 842,555.

*To all whom it may concern:*

Be it known that I, JOHN F. SULLIVAN, a citizen of the United States, and a resident of the borough of Manhattan, in the county of New York and State of New York, have invented a certain new and useful Vehicle-Signal, of which the following is a specification.

This invention relates to improvements in signals for vehicles, and especially for motor vehicles, automobiles and the like.

The purpose of the invention is to enable the driver of the vehicle to display a warning signal when stopping, slowing down or turning, which signal will be seen and heeded by following vehicles and collisions be avoided.

In the preferred construction the signal is an electric light or lights, and is so arranged and under such control of the driver that it can indicate whether the vehicle is turning to the right or to the left; and the signal is also preferably so arranged that it can be made to glow or flash intermittently, so as to more effectively catch the attention of and warn persons in following vehicles.

Other advantages of the invention will be evident from the description and explanation hereinafter contained.

Figure 4:
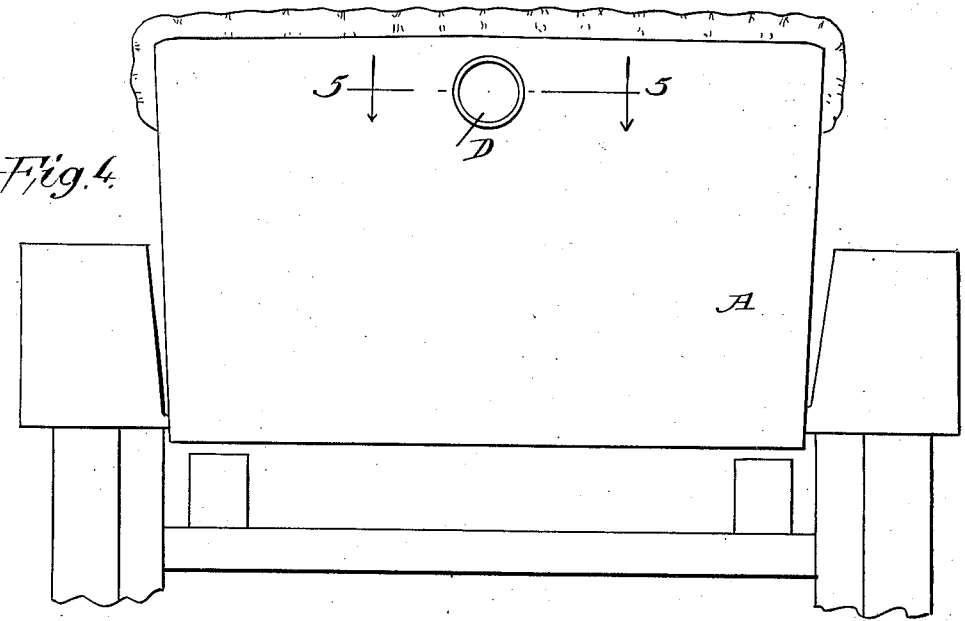
Figure 5:
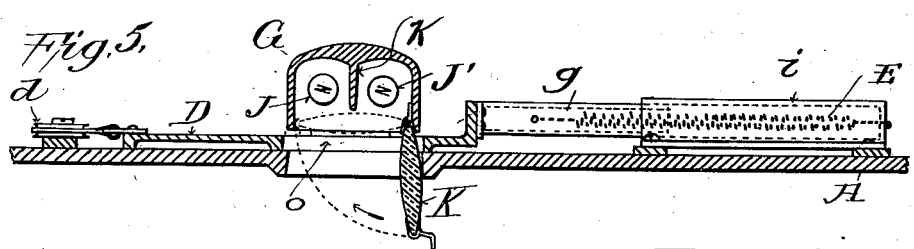
Figure 6:
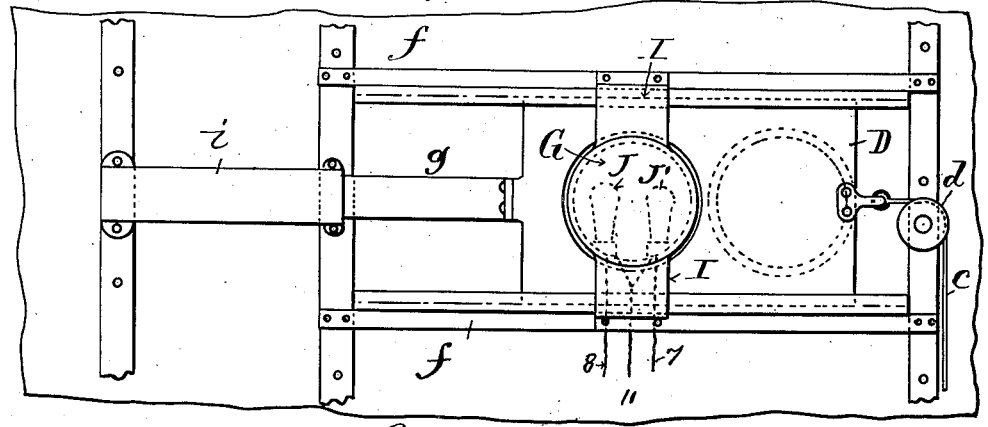

Referring to the drawings which accompany the specification to aid the description, Figure 1 is a broken side elevation of an automobile equipped with my invention. Fig. 2 is a representation, in a diagrammatic manner, of means for operating the signal shutter and of the wiring system for the signal lamps. Fig. 3 is a detail of the preferred construction of the brake and signal pedals. Fig. 4 is a rear elevation of the tonneau of an automobile equipped with my invention. Fig. 5 is a horizontal section, on large scale, on the plane of the line 5—5 of Fig. 4, the shutter being shown in the open position. Fig. 6 is a broken front elevation showing the shutter in the closed position. Fig. 7, illustrates in a diagrammatic manner a modification of the connections from the signal pedal for operating the shutter.

A being a vehicle, such as an automobile, S being the steering wheel and P the brake pedal fulcrumed in any suitable and ordinary manner on the frame, a signal pedal B is suitably fulcrumed on the said frame adjacent to said brake pedal P, and so that the flanged head $p$ of said pedal P will engage the end of said pedal B, and oscillate said pedal B when the driver presses said pedal P with his foot. An arm $b$ of said pedal B engages a wire or cable $c$, which is carried beneath the frame and partly around suitable guide sheaves as $d$—$d'$; said cable $c$ being finally secured to the sliding signal shutter D, so that when the said pedal B is oscillated said shutter D will be slid to the position shown in Fig. 5, wherein the aperture $o$ through said shutter D registers with the lens K of lamp body G, and the light of the bulbs J—J' can be seen by the persons in vehicles behind. Said shutter D is normally held in the closed position by the spring E, indicated by dotted lines in Fig. 5, and with the imperforate portion of said shutter registering with said lens K, so that said lamp and bulbs are concealed by said shutter D, which has the same color and finish as the back of the tonneau. Said shutter slides in suitable lateral guide ways $f$, and is provided with a hollow lateral arm $g$, which is guided within a corresponding lateral guide $i$, one end of said spring E being secured to said arm $g$ and the other end to said guide way $i$. Said lamp body G is secured on the inside of the rear wall of the tonneau in any suitable manner as by the lugs I, and said lamp body G is preferably divided by the partition $k$ into a left and right chamber; each said chamber containing an electric light bulb J. Said bulbs may glow with either the same or with different colors. A hinged circular door containing said lens K closes the rear side of said lamp body G, said door being provided with a suitable catch to hold it normally closed, and giving ready access to the interior of the lamp body for cleaning and repairs. I prefer to provide push buttons, or other make-and-break devices, accessible to the driver, and preferably located on the steering wheel S, as at $n$—$n$, Fig. 1, to enable the driver to flash either or both said bulbs in the manner to be hereinafter described.

Referring to Fig. 2, which represents diagrammatically the wiring system, N is a source of electricity, preferably a storage battery, carried on the frame. Insulated wires may then be run as follows:—wire 1, leads from one terminal of the said battery to a suitable part on said pedal B, in electric connection with a contact spring 2; said part and said spring 2 being insulated, if desired, from the body of said pedal B. Adjacent to said spring 2 is a contact 3, with which said spring 2 contacts when said pedal B is oscillated. From said contact 3 leads a wire 4, dividing into wires 5 and 6, which respectively run to a member of one or the other said push buttons, n or n', which said push buttons are arranged to normally close their respective circuits. Respectively from the other member of said push buttons n—n', wires 7 and 8 extend respectively to a terminal of each of the said incandescent lamps J and J'. From the other terminals of said lamps extend wires 9 and 10 respectively uniting in wire 11, which returns to the other pole of said battery N, thus completing the circuit.

From the foregoing description the operation will be evident. Normally the imperforate part of said shutter D will cover and conceal the signal lamps J—J'. But should the driver of the vehicle desire to give notice of slowing down, stopping, turning his vehicle, or of any other emergency, by actuating said pedal P he will not only apply his brake, but will also oscillate said pedal B, shift said shutter D so as to allow said lights J—J' to shine through said shutter aperture E, and at the same time close the circuit to the said lamps J—J' through the contacts 2 and 3, and the wiring as described. Thus the lamps J—J' will be ignited and will shine through said shutter aperture o, warning following vehicles. As said pedal B oscillates a lug l thereon slides below a spring catch m, which immediately flies over said lug l, and thereby holds said pedal B down to maintain the electric current through said lamps J—J' and hold said shutter D in the open position as long as desired. When the driver wishes to close the shutter and cut off the current from the said lamps he kicks the said spring catch m free from said lug l, said catch being of such width and shape that the driver can readily reach it with his toe. Then the said shutter spring throws the shutter D to the closed position, and also returns said pedal B to its normal position, breaking the electric circuit through said lamps J—J'; spring x aiding return of pedal.

Should the driver wish to indicate the direction in which he is about to turn his vehicle, he can push the proper push button, n or n', so that only the lamp in one of the chambers of the said lamp body G will glow, thus indicating the side to which the vehicle is about to turn. Should the driver wish to produce an intermittent flash of the lamps, so as to more emphatically attract attention, he will push one or both said push buttons n—n' several times, producing a flashing light as long as he wishes to.

Of course instead of carrying a cable directly from the said pedal B to the shutter by suitable guide sheaves, one cable might lead from said pedal to the short arm of a lever X pivoted on the frame at x, as shown in Fig. 7, in a diagrammatic manner and another cable c' might lead from the long arm of said lever to said shutter by suitable guide sheaves and thus the motion of the pedal arm could be multiplied any desired degree to produce great lateral motion of said shutter. But by properly proportioning the arms of said pedal B, sufficient motion of the shutter will be produced without the multiplying lever.

The several circuit wires may of course be combined into cables and carried through pipes along the frame in any suitable manner. Of course the wires 11, 1 and 4 may be separate wires for each lamp, and the wires 4, 5, 6, 7 and 8 may be carried up and down the steering wheel post in any suitable cables. Instead of having the signal pedal operated by the brake pedal, the signal pedal might of course be independently operated by the driver, but the construction herein before described is the simpler and more compact.

Now having described my improvements, I claim as my invention.

1. The combination with a body of a vehicle, of a signal lamp, a movable shutter adapted in one position to conceal said lamp and in another position to reveal it, a brake pedal, a brake, and a signal pedal operatively connected with said shutter and adapted to be actuated by said brake pedal, whereby the application of said brake moves said shutter to reveal said lamp.

2. In a vehicle signal a lamp body having a plurality of chambers within the vehicle body, a movable shutter flush with said vehicle body and means to operate said shutter to conceal or reveal said lamps, an electric lamp in each chamber, electric circuits for said lamps, and makes-and-breaks for said circuits controlled by a person in the vehicle.

3. The combination with the tonneau of a vehicle, of a lamp body having a plurality of lateral chambers, and a partition between said chambers, a lamp in each said chamber and located within the apertured wall of said tonneau, a movable shutter adapted to conceal and to reveal said lamps, and separate means operated by the driver of the vehicle to actuate said shutter and to illuminate and quench either of said lamps.

4. The combination with the body of a vehicle of a plurality of electric signal lamps, an electric generator and electric circuit for said lamps, a flash make and break in said circuit, a shutter adapted in one position to reveal and in another to conceal said lamps, a pedal operatively connected with said shutter, and adapted to make and break said circuit.

Signed at New York city, in the county of New York, and State of New York, this 29th day of May, A. D. 1914.

JOHN F. SULLIVAN.

Witnesses:
WILLIAM PATTERSON,
WALTER N. HARRIS.